United States Patent
Alpert et al.

(10) Patent No.: US 8,418,108 B2
(45) Date of Patent: Apr. 9, 2013

(54) ACCURACY PIN-SLEW MODE FOR GATE DELAY CALCULATION

(75) Inventors: Charles J. Alpert, Austin, TX (US); Zhuo Li, Cedar Park, TX (US); Gi-Joon Nam, Austin, TX (US); David A. Papa, Austin, TX (US); Chin Ngai Sze, Austin, TX (US); Natarajan Viswanathan, Austin, TX (US); Brian C. Wilson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/162,806

(22) Filed: Jun. 17, 2011

(65) Prior Publication Data

US 2012/0324409 A1 Dec. 20, 2012

(51) Int. Cl.
*G06F 17/50* (2006.01)
(52) U.S. Cl. .......... 716/113; 716/108; 716/134
(58) Field of Classification Search .......... 716/108, 716/113, 134
See application file for complete search history.

(56) References Cited

U.S. PATENT DOCUMENTS

| | | | |
|---|---|---|---|
| 5,842,155 A | 11/1998 | Bryson et al. | |
| 6,484,292 B1 | 11/2002 | Jain et al. | |
| 6,714,461 B2 | 3/2004 | Matsumoto et al. | |
| 6,868,533 B2 | 3/2005 | Alpert et al. | |
| 7,448,007 B2 | 11/2008 | Alpert et al. | |
| 7,676,780 B2 | 3/2010 | Alpert et al. | |
| 2002/0186596 A1* | 12/2002 | Matsumoto et al. | 365/189.05 |
| 2004/0215437 A1* | 10/2004 | Sul | 703/19 |
| 2010/0269083 A1 | 10/2010 | Sinha et al. | |

* cited by examiner

*Primary Examiner* — Vuthe Siek
(74) *Attorney, Agent, or Firm* — Libby Toub; Jack V. Musgrove

(57) ABSTRACT

The input slew at a selected gate of an integrated circuit design is computed by assigning a default slew rate to the output gate of a previous logic stage which is greater than a median slew rate for the design. This default slew rate is propagated through the logic stage to generate an input slew rate at the selected gate. The default slew rate corresponds to a predetermined percentile applied to a limited sample of preliminary slew rates for randomly selected gates in the design. The default slew rate is adjusted as a function of known characteristics of the wirelength from the output gate to a first gate in the second logic stage. The delay of the selected gate is calculated based on the input slew rate. The input slew rate can be stored during one optimization iteration and used as a default slew rate during a later optimization iteration.

15 Claims, 4 Drawing Sheets

ACCURACY PIN-SLEW MODE FOR GATE DELAY CALCULATION

BACKGROUND OF THE INVENTION

1. Field of the Invention

The present invention generally relates to the design of semiconductor chips and integrated circuits, and more particularly to a method of computing slew rates and gate delays for timing closure.

2. Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, combinatorial cells, core cells, scan cells, input/output (I/O) cells, and memory (storage) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 may be used for vertical and/or horizontal routing.

An IC chip is fabricated by first conceiving the logical circuit description, and then converting that logical description into a physical description, or geometric layout. This process is usually carried out using a "netlist," which is a record of all of the nets, and cells and the cell-pins creating interconnections with the nets. The netlist is transformed over the design process. The cells are assigned selections from a library of possible choices and have specific characteristics such as delay, power or area. A cell's location, or placement, is assigned in the resultant chip. The nets in the netlist are routed (wired) from cell-pin to cell-pin in a unique physical path. The netlist is checked during the refinement process to see if it meets requirements such as timing or power. Eventually, the netlist is elaborated into a layout which typically consists of a set of planar geometric shapes in several layers. The layout is then checked to ensure that it meets all of the design requirements for fabrication such as matching the function the of original netlist. The result is a set of design files known as an intermediate form that describes the layout. The design files are then run through a dataprep process that is used to produce patterns called masks by an optical or electron beam pattern generator. During fabrication, these masks are used to etch or deposit features in a silicon wafer in a sequence of photolithographic steps using a complex lens system that shrinks the mask image. The process of converting the specifications of an electrical circuit into such a layout is called the physical design.

Cell placement in semiconductor fabrication involves a determination of where particular cells should optimally (or near-optimally) be located on the surface of a integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn around time and enhanced chip performance. Several different hardware-design languages have been created for electronic design automation (EDA), including Verilog, VHDL and TDML. A typical EDA system receives one or more high level behavioral descriptions of an IC device, and translates this high level design language description into netlists of various levels of abstraction.

Physical synthesis is prominent in the automated design of integrated circuits such as high performance processors and application specific integrated circuits (ASICs). Physical synthesis is the process of concurrently optimizing placement, timing, power consumption, crosstalk effects and the like in an integrated circuit design. This comprehensive approach helps to eliminate iterations between static-timing analysis and place-and-route. Physical synthesis has the ability to repower gates (changing their sizes), insert repeaters (buffers or inverters), clone gates or other combinational logic, etc., so the area of logic in the design remains fluid. However, physical synthesis can take days to complete, and the computational requirements are increasing as designs with more gates need to be placed.

Faster performance and predictability of responses are elements of interest in circuit designs. As process technology scales with 90 nm technology and beyond, the impact of wire delay is becoming more dominant in the overall timing closure of the circuits comprising ICs such as ASIC chips and systems such as servers. Static-timing analysis is a process where the delay of a circuit is calculated assuming the worst input criteria, it provides a bound to circuit performance and is significantly computationally faster than circuit simulators such as SPICE. Timing is divided into individual circuits usually bounded by memoried elements like a latch that capture or launches a logic signal on a clock edge. Timing paths then comprise a specific path from a launching point to a capture point through a set of nets, cells and the pins connecting them. While most cells have more than one input, and often more than one output, timing analysis for a path can be simplified for the purposes of example as a path comprising single input and output cells. The timing of other paths through a cell from other launching and capture points must be calculated in a similar manner. Static-timing analysis provides a method to prune this analysis for efficiency.

As part of the timing analysis, it is necessary to compute delays caused by gates in the circuit. Gate delay is further dependent on the slew of the incoming signal. Slew (or slew rate) refers to the rise time or fall time of a switching digital signal. Different definitions can be used to quantify slew, the most common being the 10/90 slew which is the time it takes for a waveform to cross from the 10% signal level to the 90% signal level. Other definitions such as 20/80 slew or 30/70 slew are often used when the waveform has a slowly rising or falling tail. The slew is altered by the capacitance and resistance of the interconnecting nets as well as the gain of the transistors within a cell.

One common way of measuring slew is referred to as path-slew mode, wherein all slew rates are propagated through all wires and logic to compute the slew rate at any given gate. This approach is illustrated in the example of FIG. 1. The input signal has a slew of 40 ns, and a wire length leading to the first gate A increases the slew to 60 ns. Based on this input slew, gate A incurs a delay of 26 ns. Gate A refreshes the signal so the slew drops to 32 ns, and after another wire length it rises to 45 ns for input to gate B. Based on this input slew, gate B incurs a delay of 20 ns, and the output signal from gate B has a slew of 27 ns. While this approach is the most accurate, propagating the slew rate of a signal through the circuit is one of the most costly computations for incremental timing closure. Moreover, changes in slew rate typically do not propagate beyond a small number of logic levels. In order to mitigate the runtime expense of accurate slew rate computation, an abstraction called pin-slew mode can be used. In pin-slew mode the slew rate at a given gate is computed by asserting a default slew rate at the input pin of the gate of the previous logic stage. The default slew rate can be provided by the designer but is typically a mean of a random sample of slew values taken from the circuit design. That default slew rate is then propagated through the input gate and its output net to find the slew rate at the gate under consideration.

While pin-slew mode is much faster than path-slew mode, pin-slew mode can lead to significant inaccuracies, particularly near the switch in the analysis from pin-slew mode to path-slew mode. It would, therefore, be desirable to devise an improved method of computing slew rates that is faster than path-slew mode but more accurate than pin-slew mode. It would be further advantageous if the method could be implemented with low overhead and be readily incorporated in existing physical design flows.

SUMMARY OF THE INVENTION

The present invention relates to a method of computing an input slew at a selected gate of an integrated circuit design. A circuit description of the design is received having a first logic stage with one or more gates including an output gate and having a second logic stage connected to the first logic stage with one or more gates including the selected gate. A default slew rate is assigned to the output gate of the first logic stage which is greater than a median slew rate for the design. The default slew rate is propagated through the second logic stage to generate an input slew rate at an input of the selected gate. The default slew rate is preferably based on a predetermined slew percentile for the design. The predetermined slew percentile can be applied to a limited sample of preliminary slew rates for randomly selected gates in the design. The default slew rate can optionally be adjusted as a function of known characteristics of the wirelength from the output gate to a first gate in the second logic stage. The delay of the selected gate is calculated based on this input slew rate. The input slew rate can be stored during one optimization iteration and, during a later optimization iteration, propagated through a third logic stage connected to the second logic stage to generate another input slew rate at an input of another selected gate.

The above as well as additional features and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
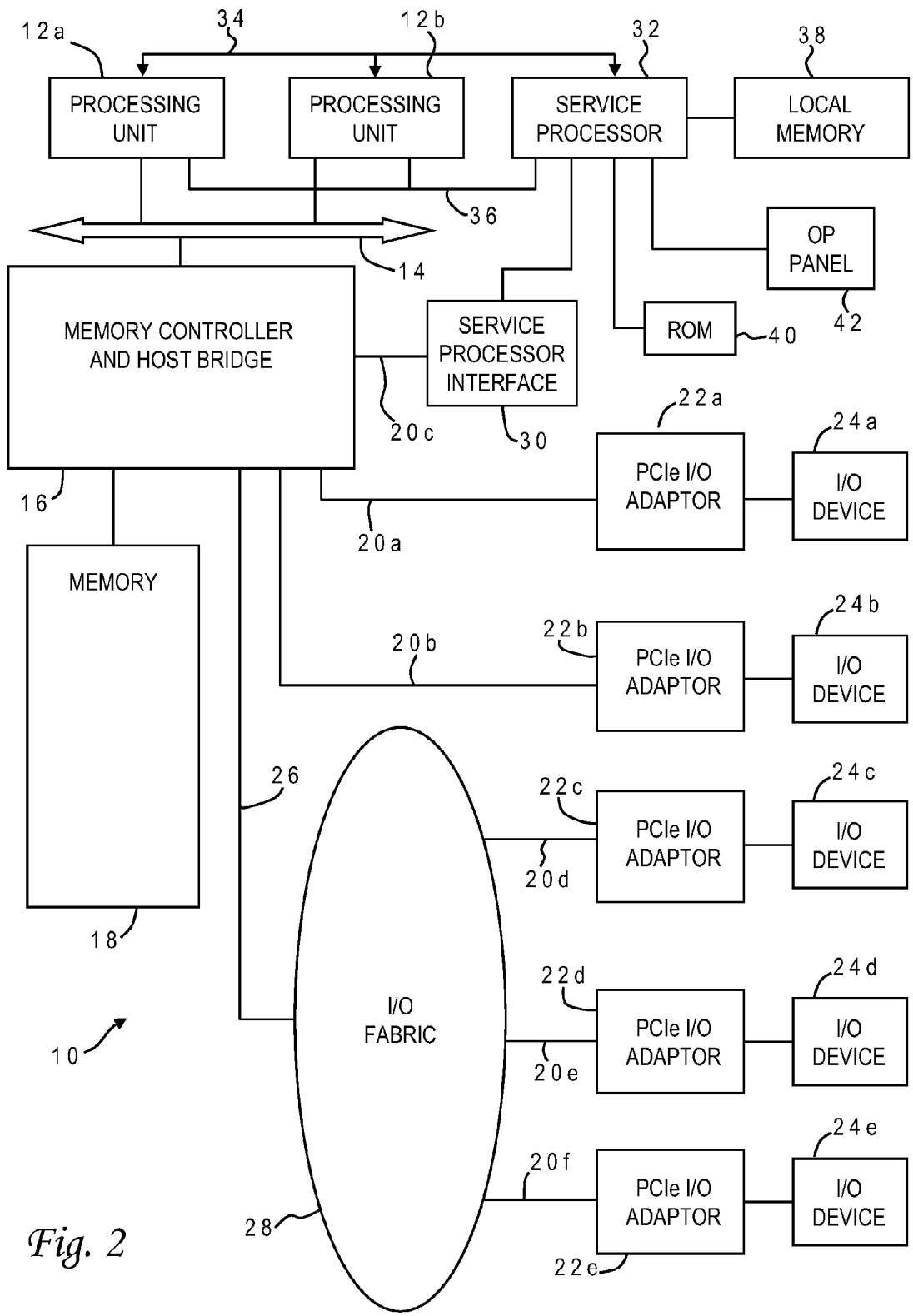
FIG. 2 is a block diagram of a computer system programmed to carry out timing analysis in accordance with one implementation of the present invention.

With reference now to the figures, and in particular with reference to FIG. 2, there is depicted one embodiment 10 of a computer system in which the present invention may be implemented to carry out timing analysis for an integrated circuit design. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit design application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media exclude transitory media.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention.

In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a circuit design process that uses novel slew computation techniques to facilitate timing closure. Accordingly, a program embodying the invention may include conventional aspects of various circuit design tools, and these details will become apparent to those skilled in the art upon reference to this disclosure.

Figure 1:
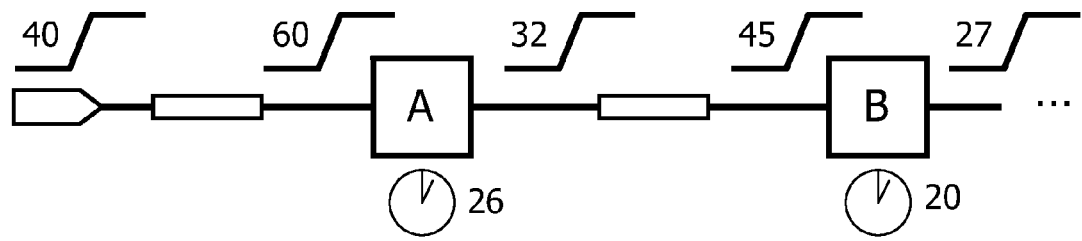
FIG. 1 is a pictorial representation of slew rate and gate delay computation using a conventional path-slew mode analysis.
Figure 3:
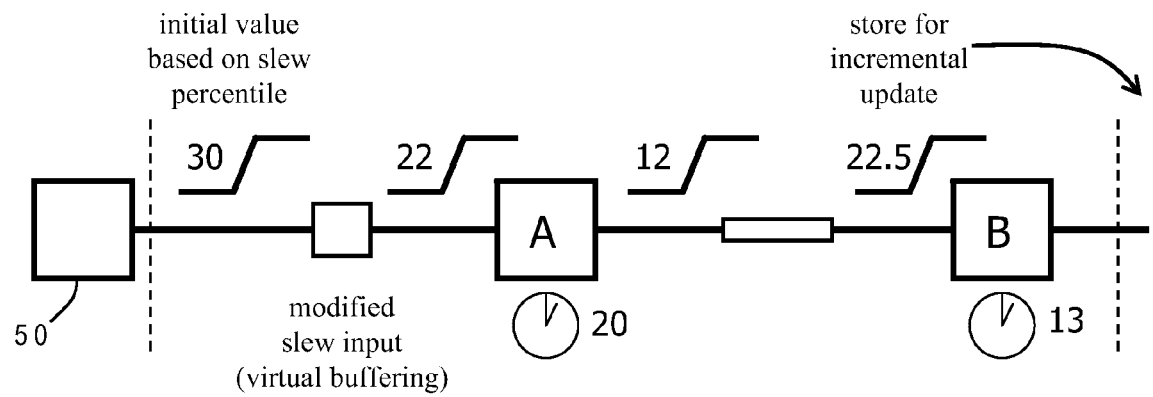
FIG. 3 is a pictorial representation of an improved pin-slew mode analysis in accordance with one implementation of the present invention.

Referring now to FIG. 3, there is depicted one example of a logic stage of an integrated circuit design whose timing may be analyzed in accordance with the present invention. The present invention enhances conventional pin-slew mode analysis by providing an improved default slew rate which can be applied to the output of a previous logic stage. This improved default slew rate is then propagated through the output net to the gate under consideration. The default slew rate is adjusted by introducing pessimism into the calculation, i.e., selecting a default slew rate which is greater than (worse than) the median of a preliminary slew sample. In particular, the invention optimizes the default slew rate by selecting a value which lies in the $30^{th}$-$40^{th}$ percentile range for the sample, most preferably about the $35^{th}$ percentile (0 percentile=worst slew, $50^{th}$ percentile=median, $100^{th}$ percentile=best slew). The design tool carrying out the present invention can use a predetermined percentile value or can prompt the designer to enter a value. This adjustment of the default slew rate has been shown to significantly reduce or eliminate the degradation in the timing analysis that can occur at the switch from pin-slew mode to path-slew mode.

In the example of FIG. 3 the output gate 50 of the previous (upstream) logic stage is assigned an initial value of 30 ps based on the $35^{th}$ percentile applied to the preliminary slew rates in the sample. Any method may be used to obtain the preliminary slew distribution, preferably a quick calculation such as a less accurate, conventional pin-slew mode analysis for a limited random sample of gates. The improved default slew rate can be recomputed in subsequent optimization iterations using later distributions, i.e., distributions resulting from use of the improved pin-slew mode of the present invention, and with larger samples.

While the improved default slew value significantly increases the accuracy of the slew computations, use of a constant value appears to be the primary source of error in the pin-slew model. The present invention can optionally be extended to mitigate this effect by applying an additional formula to the input of the logic stage based on the input wirelength, i.e., the wirelength from the output of the previous logic stage (gate 50) to the input of the first gate in the current logic stage (gate A). The formula depends on known quantities such as driver resistance, distance, and wire layer. In an exemplary implementation the input slew is given as $$S_i = \sqrt{S_d^2 + (2.2 RC)^2}$$

where $S_i$ is the input slew at gate A, $S_d$ is the improved default slew $35^{th}$ percentile), R is the resistance of the wirelength, and C is the capacitance of the wirelength. For the example of FIG. 3 this further adjustment results in an input slew of 22 ps.

This modification to the input slew may be further refined in cases where the input wirelength exceeds some predetermined threshold, e.g., 1 mm. The program product implementing the present invention (operating on computer system 10) may estimate that a certain number of buffers would be required along this wirelength to meet slew constraints, in which case the foregoing formula can use resistance and capacitance values for a shorter wirelength, i.e., the wirelength from the last buffer inserted prior to the gate (e.g., 100 μm). A lookup table or any quick buffering method may be used to estimate the number of virtual buffers required and their placement.

Once the input slew at gate A has been computed the gate delay can be calculated according to known methods. Gate delay is generally a function of slew and load, and while formulas may be used to derive the gate delays they are instead preferably derived using lookup tables and interpolation. Different lookup tables can be provided in the circuit design tool embodying the present invention for different technologies (e.g., 90 nm) and libraries (power levels). For the example of FIG. 3 the input slew of 22 ps results in a delay at gate A of 20 ps (this delay is immaterial since only the output slew affects the delay at gate B which is the goal of the procedure). Based on this input slew gate A also has an output slew of 12 ps which becomes 22.5 ps after an additional wirelength from gate A to gate B. The change in slew from this wirelength is computed using conventional formulas. Based on the input slew of 22.5, the appropriate lookup table results in a delay of 13 ps at gate B. The output slew at gate A can be computer according to conventional methods. Gate output slew is generally a function of input slew and load so is easily computed using a lookup table, but more accurate methods may be employed such as SPICE simulation or waveform tables.

Prior art timing tools perform incremental slew updates in pin-slew mode many times during iterative optimization. While the work of slew propagation during these updates is the goal of pin-slew mode, the actual slew data has traditionally been discarded after each iteration. The present invention can optionally store this data for the next time a calculation involving it is required. For example, if the tool is examining a gate immediately downstream from gate B, then the slew rate of 22.5 ps can be used as the upstream slew rate for that analysis. Historical slew values can be retained and average values can be used depending upon the amount of memory available in computer system 10. The historical data could also be used as starting points for later detailed timing analysis using path-slew mode.

Figure 4:
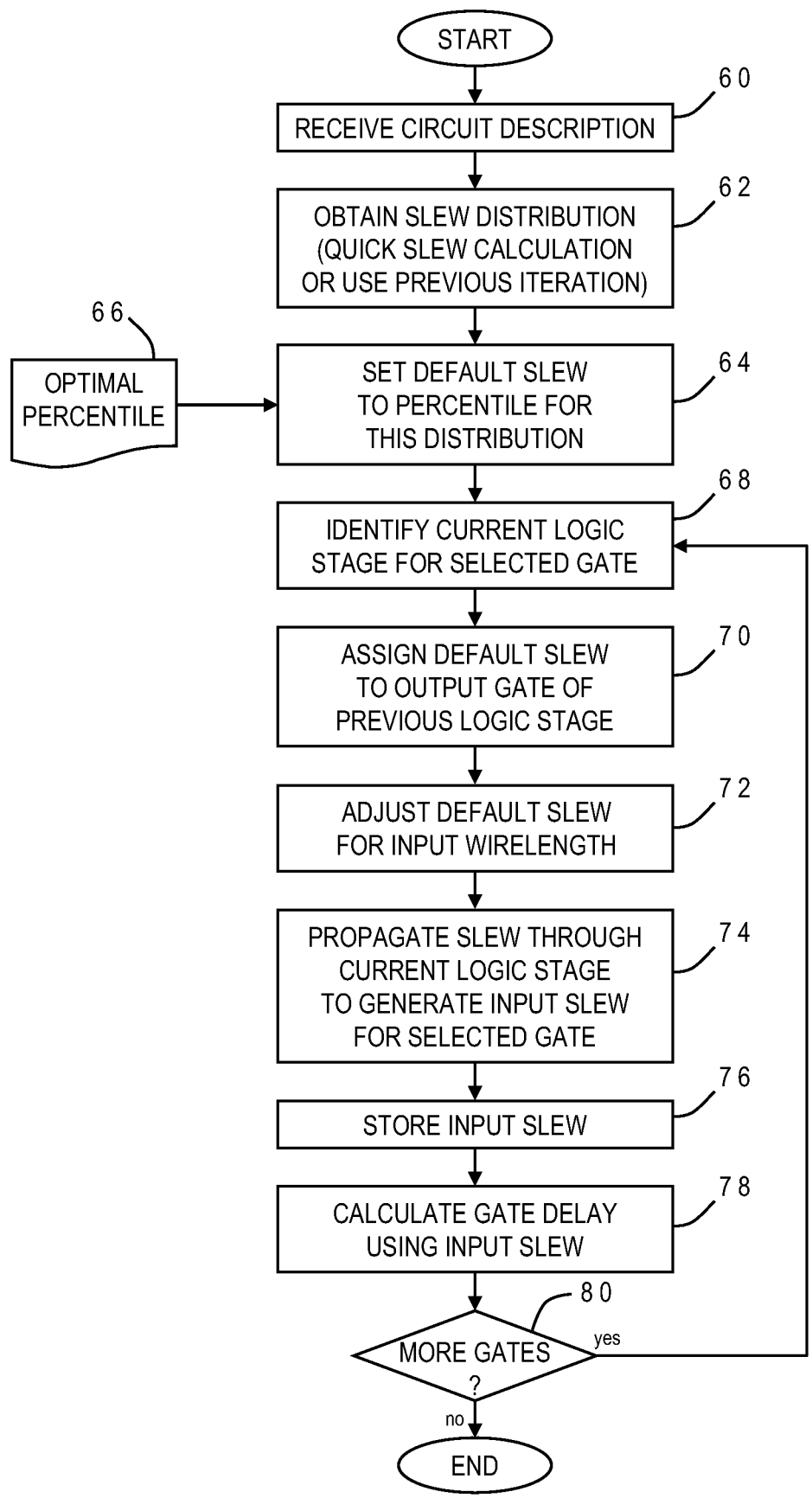
FIG. 4 is a chart illustrating the logical flow for computing the slew rate at an input of a selected gate in an integrated circuit design and calculating the delay at the selected gate in accordance with one implementation of the present invention.

The present invention may be further understood with reference to FIG. 4 which illustrates the flow for a gate delay calculation process in accordance with one implementation of the present invention. The process begins when computer system 10 receives a description of the circuit such as a netlist which includes the gate locations and interconnections (60). A limited number of slew rates for a sample of gates in the circuit is obtained (62). The slew rates can be generated from a quick slew calculation, or a sample may be taken from a previous optimization iteration. The default slew rate is set to the slew value corresponding to the predetermined percentile for this slew distribution (64). The optimal percentile may be entered by the designer or operator of the timing tool (66). A gate is selected for delay calculation as part of the timing analysis and the corresponding logic stage is identified (68).

The previous logic stage can be demarcated manually or automatically according to design or analysis rules or previous identification of circuit nets. The default slew rate is applied to the output gate of the previous logic stage (70) and is adjusted based on the input wirelength according to the previously explained formula (72). The adjusted slew is propagated through the logic stage to the input of the gate under consideration (74) and is stored for use in future iterations (76). The delay at the selected gate is then calculated using the gate input slew (78). The process repeats for each gate whose delay is required (80).

Figure 5:
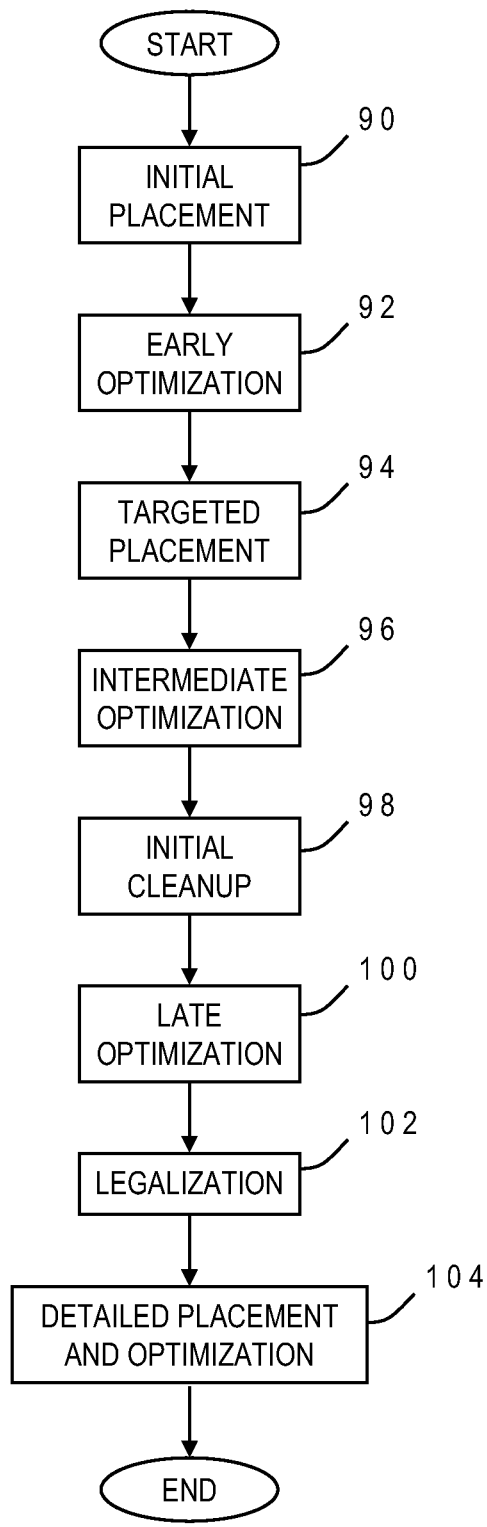
FIG. 5 is a chart illustrating the logical flow for a design process which includes multiple iterations of timing optimizations in accordance with one implementation of the present invention.

The slew rate and gate delay calculations may be included in multiple iterative optimizations at part of the circuit design process. One exemplary implementation for the overall design process is illustrated in FIG. 5. The process begins with an initial placement based on a layout for the circuit (90). The layout can be provided by an EDA tool, or can simply be a random layout for the circuit elements. The initial placement locates all circuit elements in a region of the integrated circuit using for example quadratic placement. Other placement techniques may be used. For the initial placement, all wires (edges) have the same net-weighting. The timing of the circuit is then analyzed and adjusted in early optimization (92). This optimization may include gate re-sizing and buffer insertion, and uses the present invention as needed to calculate gate delays. A targeted placement (94) follows which is similar to the initial placement but the layout is now the output of the early optimization, and different weights can be applied to different edges based on the timing constraints. The partitioning may also be finer for the weighted placement. The targeted placement is followed by one or more intermediate optimizations (96) which provide different logic optimizations such as buffer insertion but at a finer (or sometimes the same) level. The intermediate optimizations again utilize the present invention as needed to calculate gate delays. The intermediate optimizations are followed by an initial cleanup (98) which corrects any violations. The cleanup is followed by a late optimization (100) which is conceptually similar to the other optimizations but at a more refined level. Each of the optimizations may include many iterations of timing analysis requiring the present invention. As noted above, historical slew data from any of these iterations can be used for later gate delay calculations. Legalization (102) is performed after late optimization to resolve any overlaps among the circuit elements. The final step is detailed placement and optimization which further refines the layout using for example min-cut placement or heuristic techniques (104). These specific steps are exemplary only as the design process could have other optimizations and other phases.

The present invention can accordingly address the deficiencies in the current pin slew model through several enhancements. These low overhead enhancements can be readily incorporated in existing physical design flows and can be very useful in timing closure. The additional lookup for input wirelength serves to further improve accuracy without increasing asymptotic complexity.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the present invention provides a methodology for computing slew rates at gates of an integrated circuit design and is thus particularly useful for computing gate delay, but the slew computations may be used for other aspects of the timing analysis. It is therefore contemplated that such modifications can be made without departing from the spirit or scope of the present invention as defined in the appended claims.

What is claimed is:

1. A computer-implemented method of computing an input slew at a selected gate of an integrated circuit design, comprising:
   receiving a circuit description of the design having a first logic stage with one or more gates including an output gate and having a second logic stage connected to the first logic stage with one or more gates including the selected gate, by executing first program instructions in a computer system;
   assigning a default slew rate to the output gate of the first logic stage wherein the default slew rate is greater than a median slew rate for the design and is based on a predetermined slew percentile for the design, by executing second program instructions in the computer system; and
   propagating the default slew rate through the second logic stage to generate an input slew rate at an input of the selected gate, by executing third program instructions in the computer system.

2. The method of claim 1 wherein the predetermined slew percentile is applied to a limited sample of preliminary slew rates for randomly selected gates in the design.

3. The method of claim 1, further comprising adjusting the default slew rate prior to said propagating according to the formula $$S_i = \sqrt{S_d^2 + (2.2RC)^2}$$

where $S_i$ is an adjusted slew rate, $S_d$ is the default slew rate, R is a resistance of an input wirelength to a first gate in the second logic stage, and C is a capacitance of the wirelength.

4. The method of claim 1, further comprising:
   storing the input slew rate during a first optimization iteration; and
   during a second optimization iteration subsequent to said first optimization iteration, propagating the input slew rate through a third logic stage connected to the second logic stage to generate another input slew rate at an input of another selected gate.

5. The method of claim 1, further comprising calculating a delay of the selected gate based on the input slew rate.

6. A computer system comprising:
   one or more processors which process program instructions;
   a memory device connected to said one or more processors; and
   program instructions residing in said memory device for computing an input slew at a selected gate of an integrated circuit design by receiving a circuit description of the design having a first logic stage with one or more gates including an output gate and having a second logic stage connected to the first logic stage with one or more gates including the selected gate, assigning a default slew rate to the output gate of the first logic stage wherein the default slew rate is greater than a median slew rate for the design and is based on a predetermined slew percentile for the design, and propagating the default slew rate through the second logic stage to generate an input slew rate at an input of the selected gate.

7. The computer system of claim 6 wherein the predetermined slew percentile is applied to a limited sample of preliminary slew rates for randomly selected gates in the design.

8. The computer system of claim 6 wherein said program instructions further adjust the default slew rate prior to said propagating according to the formula $$S_i = \sqrt{S_d^2 + (2.2RC)^2}$$

where $S_i$ is an adjusted slew rate, $S_d$ is the default slew rate, R is a resistance of an input wirelength to a first gate in the second logic stage, and C is a capacitance of the wirelength.

9. The computer system of claim 6 wherein said program instructions further store the input slew rate during a first optimization iteration and, during a second optimization iteration subsequent to said first optimization iteration, propagate the input slew rate through a third logic stage connected to the second logic stage to generate another input slew rate at an input of another selected gate.

10. The computer system of claim 6 wherein said program instructions further calculate a delay of the selected gate based on the input slew rate.

11. A computer program product comprising:
a computer-readable storage medium; and
program instructions residing in said storage medium for computing an input slew at a selected gate of an integrated circuit design by receiving a circuit description of the design having a first logic stage with one or more gates including an output gate and having a second logic stage connected to the first logic stage with one or more gates including the selected gate, assigning a default slew rate to the output gate of the first logic stage wherein the default slew rate is greater than a median slew rate for the design and is based on a predetermined slew percentile for the design, and propagating the default slew rate through the second logic stage to generate an input slew rate at an input of the selected gate.

12. The computer program product of claim 11 wherein the predetermined slew percentile is applied to a limited sample of preliminary slew rates for randomly selected gates in the design.

13. The computer program product of claim 11 wherein said program instructions further adjust the default slew rate prior to said propagating according to the formula $$S_i = \sqrt{S_d^2 + (2.2RC)^2}$$

where $S_i$ is an adjusted slew rate, $S_d$ is the default slew rate, R is a resistance of an input wirelength to a first gate in the second logic stage, and C is a capacitance of the wirelength.

14. The computer program product of claim 11 wherein said program instructions further store the input slew rate during a first optimization iteration and, during a second optimization iteration subsequent to said first optimization iteration, propagate the input slew rate through a third logic stage connected to the second logic stage to generate another input slew rate at an input of another selected gate.

15. The computer program product of claim 11 wherein said program instructions further calculate a delay of the selected gate based on the input slew rate.

* * * * *